United States Patent [19]

Ruggeri et al.

[11] 4,206,720

[45] Jun. 10, 1980

[54] ANIMAL CAGE RACK INCORPORATING SHELF LEVELING DEVICE

[75] Inventors: Albert Ruggeri; Joseph Ruggeri, both of Flourtown, Pa.; Harry Lawrence, Glen Ridge, N.J.

[73] Assignee: Lab Products, Inc., Rochelle Park, N.J.

[21] Appl. No.: 949,272

[22] Filed: Oct. 6, 1978

[51] Int. Cl.² ............................ A01K 1/01; A01K 1/03
[52] U.S. Cl. ........................................ 119/17; 119/22
[58] Field of Search ...................... 119/22, 17, 18, 15; 108/5, 6, 7, 9, 106, 110, 144, 147; 312/257 SK

[56] References Cited

U.S. PATENT DOCUMENTS 2,447,704  8/1948  Kline .................................... 108/110
3,463,123  8/1969  Hoeltge ............................... 119/22 X Primary Examiner—Hugh R. Chamblee
Attorney, Agent, or Firm—Edward F. Levy

[57] ABSTRACT

An animal cage rack incorporating a shelf leveling device includes a support frame in which a plurality of shelves are adjustably mounted. The corners of the shelves rest on height adjustment devices which may be rotated to adjust the height of each of corners, after which the shelves may be locked to the support frame. In one embodiment of the invention, the adjustment device is an adjusting screw. Additional embodiments of the invention include cam-operated height adjustment devices which either adjust the height of individual corners of shelves or alternatively adjust the heights of corresponding corners of several shelves.

12 Claims, 15 Drawing Figures

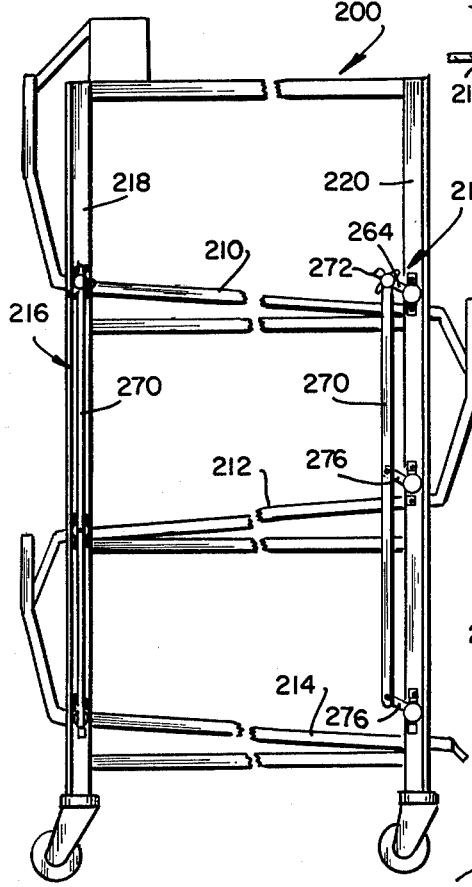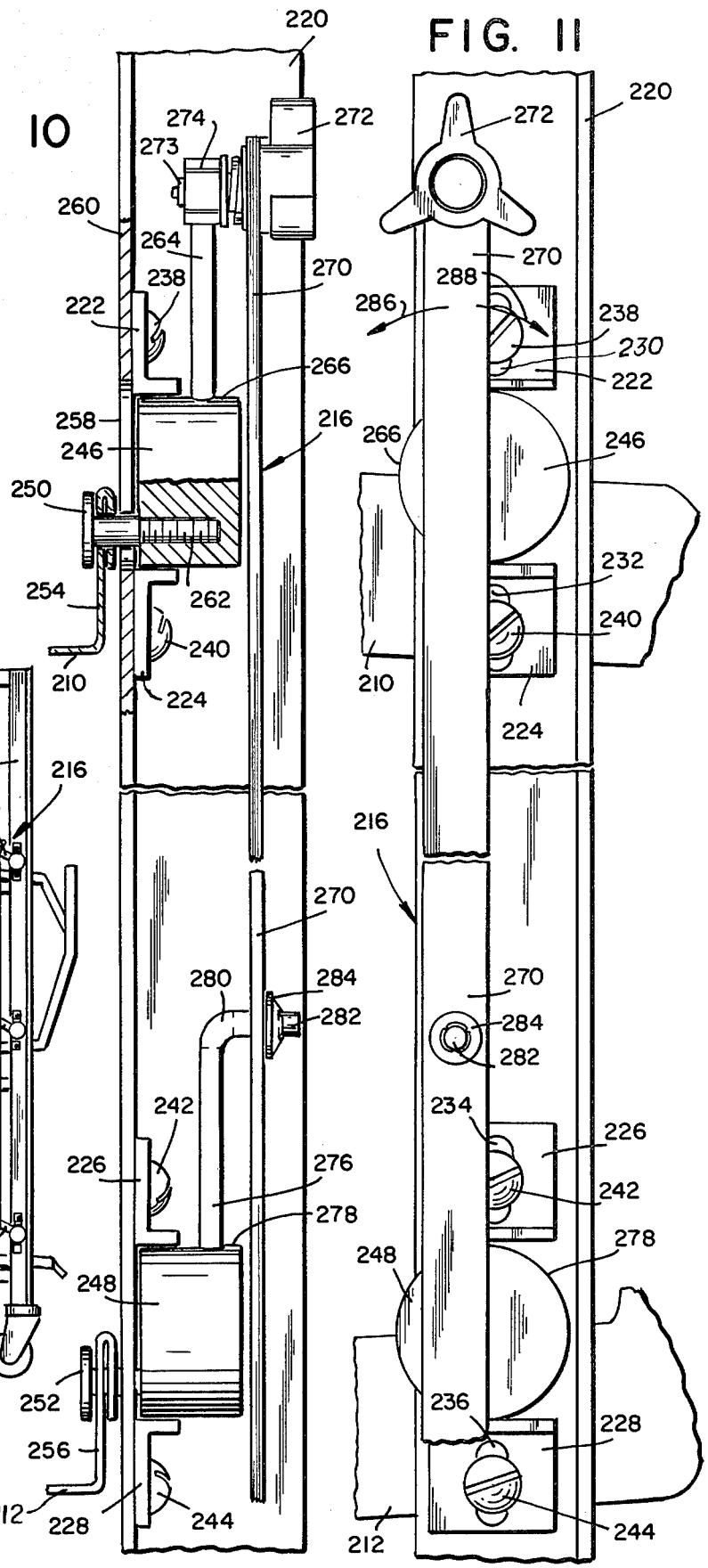

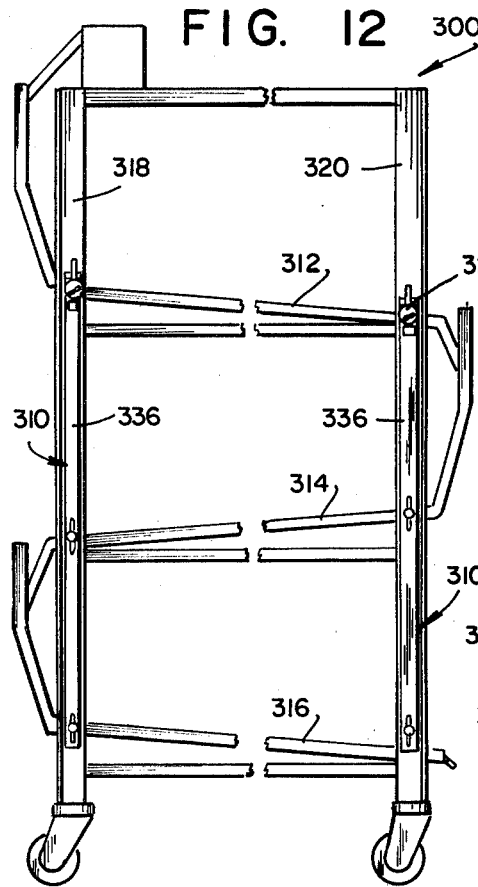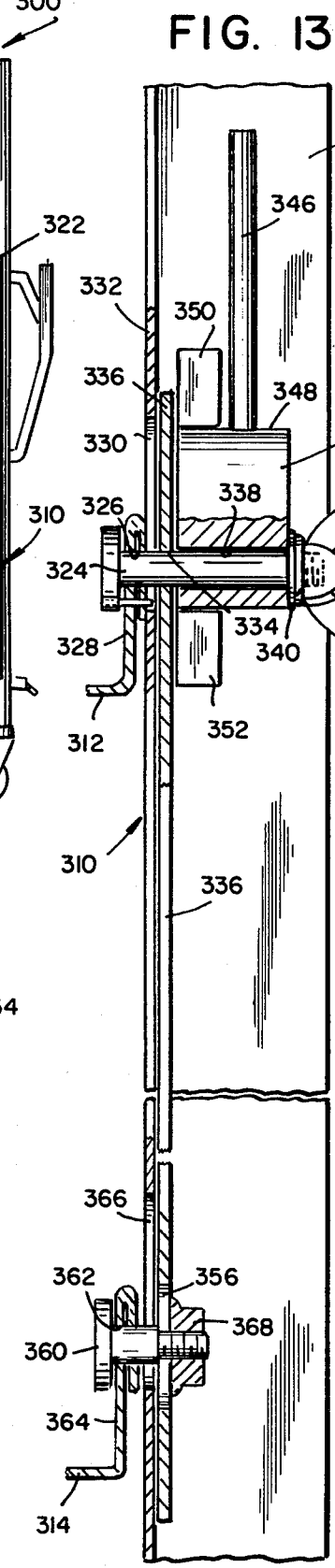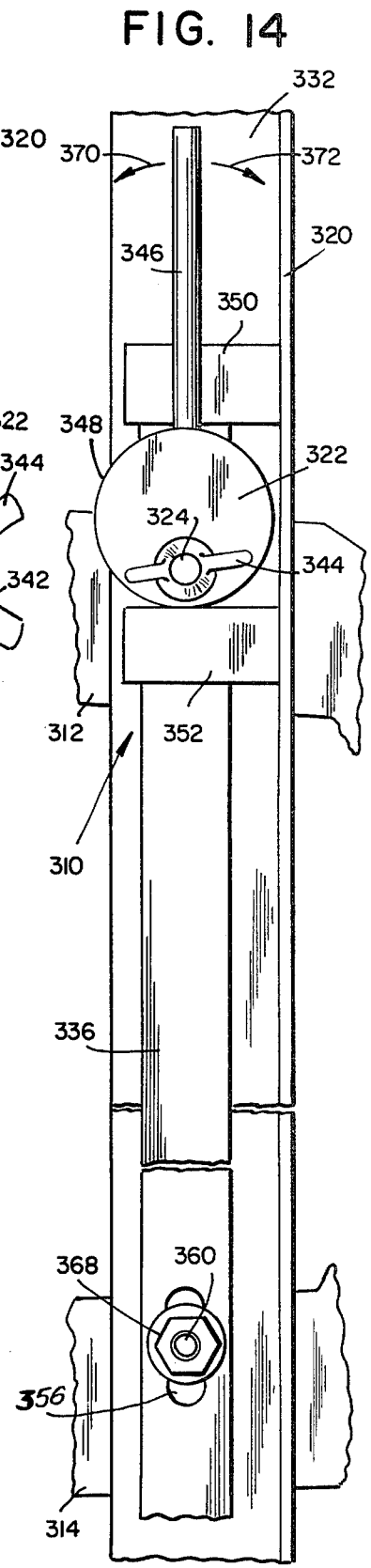

ANIMAL CAGE RACK INCORPORATING SHELF LEVELING DEVICE

The present invention relates generally to self-flushing racks for the maintenance of laboratory animal cages, and more particularly to an animal cage rack which incorporates shelf leveling devices for each of the cage-supporting shelves thereof.

The prior art related to animal cage racks includes the device shown in U.S. Pat. No. 3,463,123, entitled "Adjustable Rack and Waste Removal Means for Animal Cages," in which a plurality of shelves is arranged so that water discharged onto an upper shelf cascades downwardly from shelf to shelf in order to flush away animal waste materials. The shelves are fixed relative to each other within a rack structure and the rack structure includes four adjustable height caster wheels. The height of each of these wheels must be adjusted in order to provide the proper flow of water from shelf to shelf.

This construction is subject to numerous disadvantages included among which is the need for close tolerances and careful assembly of the shelves within the rack structure to ensure that the shelves are each at the proper angles to permit the correct flow of water. The shelves, once installed at the factory, cannot easily be realigned or adjusted so that damage to or loosening of an individual shelf either during initial shipment, or when the rack is moved from place to place during use in a laboratory, can cause the entire assembly to become inoperative requiring costly adjustment or replacement with consequent loss of operating time. In addition, the adjustable height caster wheels are often subject to rust and corrosion due to the presence of water and other laboratory fluids and consequently become difficult or impossible to adjust and require expensive repair or replacement. In addition, the tools required for adjustment of the caster are usually not readily advailable to animal care personnel, and consequently the necessary level adjustment often goes unattended. Furthermore, the location of adjustment at the caster is awkward and often messy.

It is a major object of the present invention to overcome the disadvantages of the prior art by providing an animal cage rack incorporating a shelf leveling device which makes possible the quick and easy adjustment of individual shelves relative to the rack frame and to each other.

Another object of the present invention is to provide an animal cage rack in which the inclination of individual shelves may be varied to vary the flow of cleaning fluids according to individual needs.

Another object of the present invention is to provide an animal cage rack in which corresponding corners of shelves in a vertical array may be adjusted simultaneously.

Another object of the present invention is to provide an animal cage rack in which individual shelves can be adjusted and fixed in place without tools.

Another object of the present invention is to provide an animal cage rack incorporating a shelf leveling device which may be easily assembled and disassembled thereby making shipment in a disassembled condition possible.

Still another object of the present invention is to provide an animal cage rack incorporating a shelf leveling device comprising relatively few parts which are economical of manufacture.

In accordance with the present invention an animal cage rack incorporating a shelf leveling device comprises a support frame in which a plurality of shelves are mounted with corners of each of the shelves adjustably connected to vertical members of a support frame. Adjacent to each of the corners of the shelves the vertical members include a support block which has a vertically oriented tapped hole. An adjustment screw is threaded into each of the tapped holes and the corners of each of the shelves rests on the end of an adjustment screw. Rotating the screw raises or lowers the height of the corner of the shelf. When the adjustments are completed the shelves are locked against the vertical members of the support frame by a bolt which passes through a vertically oriented elongated hole in the support members.

In an alternate embodiment of the invention, each of the corners of each of the shelves are provided with a cam-operated shelf leveling device. The shelf leveling device includes a cylindrical cam which is eccentrically mounted on a flange of the shelf and which is guided by a pivot bolt which rides in a vertically oriented elongated hole in the vertical member of the support frame and by a pair of cam guides which are mounted on the support frame. Rotation of the cam, by means of an attached handle, moves a corner of a shelf up or down as desired and the shelf corner can be locked in place without the use of tools by means of a threaded fastener and a wing nut which prevents rotation of the cam, when tightened.

In another alternative embodiment of the invention, a connecting bar is provided which connected the handles of all of the cams which are mounted on the same vertical member of the support frame. This makes it possible to adjust all of the corners of the shelves which are in a vertical array merely by adjusting a single cam.

In still another alternative embodiment of the invention, a single cam is provided on each of the vertical members of the support frame and is connected to the corner of a shelf generally as described above. Corresponding corners of the remaining shelves are connected to the pivot bolt, which is moved by the cam, by means of a connecting link. The shelves are adjustably connected to the connecting link and the position of each of the corners may be varied with respect to the connecting link.

Additional objects and advantages of the present invention will become apparent during the course of the following specification when taken in connection with the accompanying drawings in which:

FIG. 9 is a front elevation view of an animal cage rack incorporating another alternative embodiment of the shelf leveling device according to the present invention, with portions of the rack broken away;

FIG. 10 is an enlarged fragmentary side view of a portion of the animal cage rack of FIG. 9 showing details of construction;

FIG. 11 is a fragmentary front view of the portion of the animal cage rack shown in FIG. 10;

FIG. 12 is a front elevation view of an animal cage incorporating still another alternative embodiment of the shelf leveling device according to the present invention, with portions of the rack broken away;

FIG. 13 is an enlarged fragmentary side view of a portion of the animal cage rack of FIG. 12 showing details of construction;

FIG. 14 is a fragmentary front view of the portion of the animal cage rack shown in FIG. 13; and FIG. 15 is a plan view of a connecting bar shown removed from the animal cage rack shown in FIG. 12.

Figure 1:
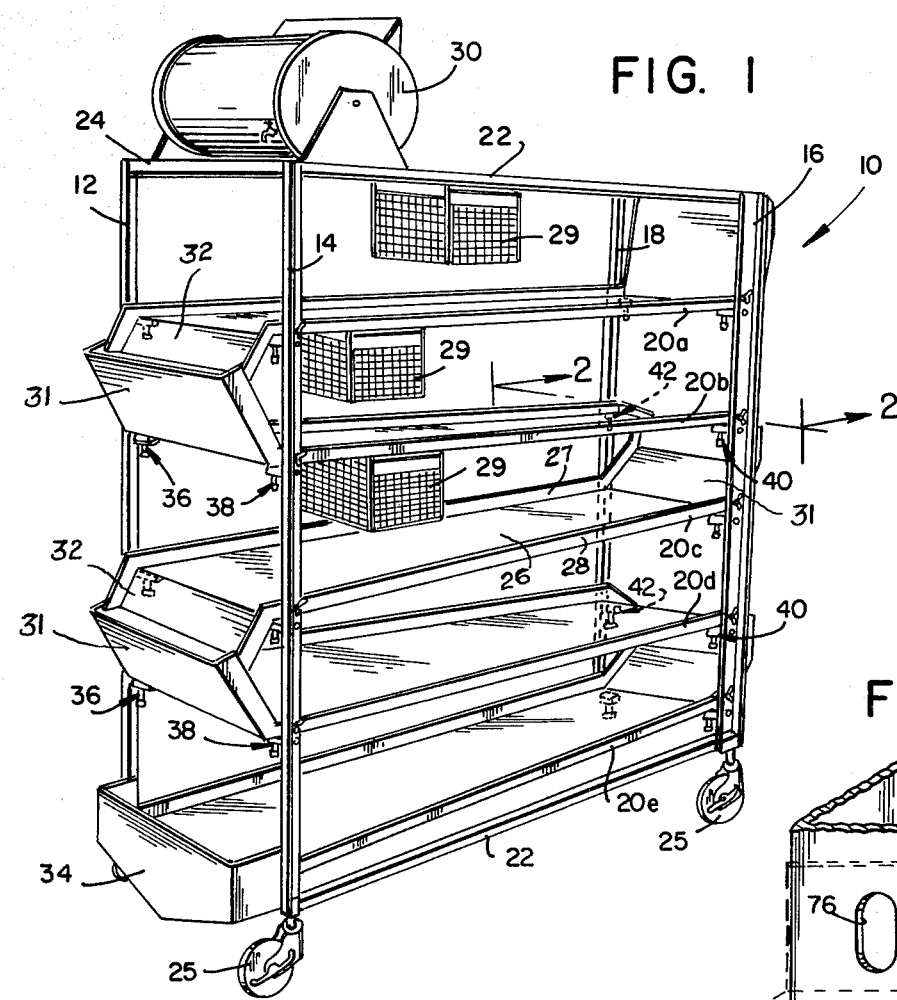
FIG. 1 is an overall perspective view of an animal cage rack incorporating a shelf leveling device according to the present invention.

Referring in detail to the drawings, there is shown in FIG. 1 an animal cage rack 10 made in accordance with the present invention and comprising four upstanding and vertically-disposed spaced rails or angle irons 12, 14, 16 and 18 which support a plurality of generally rectangular shelves 20a, 20b, 20c, 20d and 20e. The upright rails 12, 14, 16 and 18 are connected and rigidified by support bars 22 and 24, and each rail is mounted on a wheel or caster 25, so that the entire rack 10 may be rolled from place to place.

Each of the shelves 20a, 20b, 20c, 20d and 20e has a flat central portion 26 bordered by a pair of upwardly directed flanges 27, 28 to provide a ramp for directing a flow of water or other cleaning fluid to cleanse the rack in a manner to be described presently. Each shelf is also provided on its lower surface with a row of spaced brackets (not shown) for slidably receiving and retaining animal cages 29, some of which are shown in FIG. 1. In use of the rack 10, animal cages 29 would be normally suspended in side-by-side relationship along the entire length of each shelf 20a, 20b, 20c, 20d and 20e. Animal droppings and other waste from each of the cages 29 will fall and accumulate upon the upper surface of the shelf immediately below the respective cages, and a water flushing system is provided to clean the ramp surfaces of the shelves from these wastes. For this purpose, the shelves 20 are inclined downwardly in alternating opposite directions, as shown in FIG. 1, with a charge of water supplied at desired intervals from a reservoir 30 mounted at the top of the rack 10. The elevated end of each of the shelves 20 is provided with an upwardly inclined extension 31 which cooperated with a downwardly inclined extension 32 at the lowered end of the next shelf thereabove, to provide water communication between the shelves. Thus, water supplied by reservoir 30 to the upper ramp surface of the uppermost shelf 20a flows continuously and successively along the upper ramp surfaces of the succeeding shelves 20b, 20c, 20d and 20e to a collection tank 34.

In use, the rack 10 may be rolled from place to place, and be left standing on surfaces which are not precisely horizontal so that inclination of the shelves 20 in either direction are not sufficient to provide an even flow of water therealong, or so that the upper ramp surfaces are tilted transversely, causing waste material to collect on the shelves and/or the water to spill over the flanges 27 and 28. To prevent such misalignment of the shelves, each of the shelves 20a, 20b, 20c, 20d and 20e is provided at each corner with a shelf leveling device in accordance with the present invention, in one embodiment, shown in FIGS. 1 to 6, the leveling device being in the nature of an adjustment screw. Each shelf 20 rests at its corners upon four leveling devices 36, 38, 40 and 42, as shown in FIG. 1.

Figure 2:
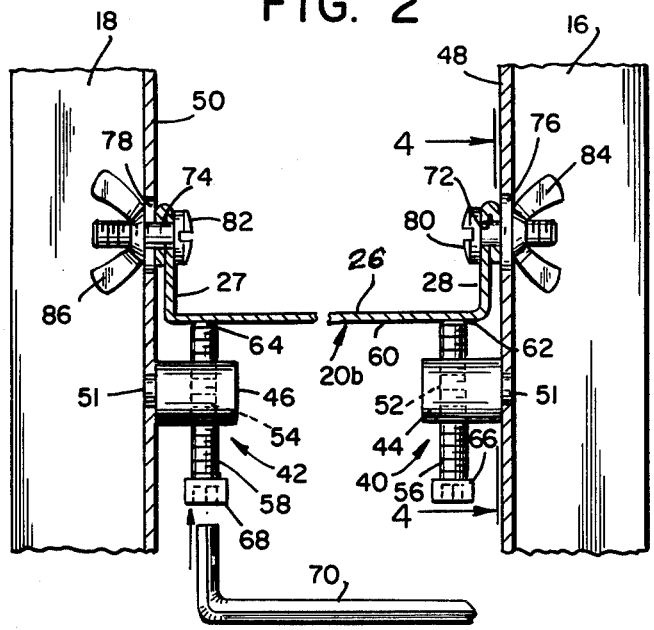
FIG. 2 is an enlarged section taken along the line 2—2 of FIG. 1, and showing a wrench about to be inserted into the shelf leveling device.
Figure 3:
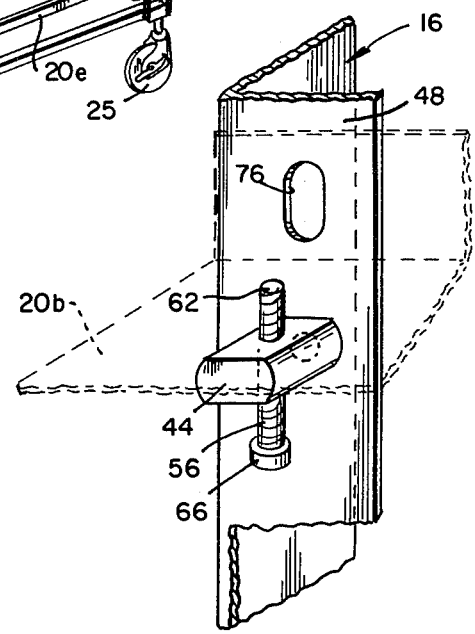
FIG. 3 is a fragmentary perspective view drawn to an enlarged scale, showing the shelf leveling device with a fragment of a shelf shown in broken lines.
Figure 4:
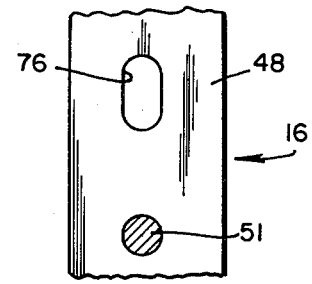
FIG. 4 is a fragmentary cross-sectional view taken along the line 4—4 of FIG. 2.

FIG. 2 shows two of the leveling devices 40 and 42 mounted on the vertical rails 16 and 18, and supporting one end of the shelf 20b. The leveling devices 40 and 42 include respective adjustment blocks 44 and 46 secured to opposing flanges 48 and 50 of the rails 16 and 18. The blocks 44, 46 are horizontally alinged and are attached to the flanges 48, 50 of the upright rails 16, 18 in a conventional manner such as rivets 51, screws or by welding. The blocks 44, 46 each have a tapped hole 52, 54 which is generally parallel to the upright rail on which it is mounted and in which there is disposed a height adjustment screw 56, 58. The lower surface 60 of the central portion 26 of the shelf 22 rests on the upper ends 62, 64 of the height adjustment screws 56, 58. The opposite ends of the height adjustment screws 56, 58 are formed with socket-type heads 66, 68, such as Allen-type heads, and a wrench 70 is provided for operation of the screws 56, 58.

The flanges 27, 28 of the shelf 20b each have a hole 72, 74 which is in alignment with an elongated slot 76, 78 formed in the adjacent flanges 48, 50 of the respective upright members 16, 18. The elongated slot 76 is most clearly shown by way of example in FIGS. 3 and 4. A respective bolt 80, 82 passes through each of the holes 72, 74 and the registering elongated slots 76, 78 and is secured by means of a respective wing nut 84, 86. When the wing nuts 84, 86 are tightened, the flanges 27, 28 of the shelf 20b are clamped against the flanges 48, 50 of the upright rails 16, 18 respectively.

The leveling devices 40 and 42 mounted on the upright rails 16 and 18 for supporting the right-hand ends of shelves 20a, 20c, 20d and 20e are of a structure identical to that just described. The leveling devices 36 and 38 mounted on upright rails 12 and 14 for supporting the left-hand ends of the shelves, are also of identical construction.

During the operation of the shelf leveling device 40, 42 the wing nuts 84 and 86 are loosened. The wrench 70 is then used to adjust the height of the adjacent end of shelf 20b by rotating the screws 56 and 58. The wing nuts 84, 86 are then tightened. This procedure is repeated at each end of each of the shelves 20a, 20b, 20c, 20d and 20e. The shelf leveling devices 36, 38, 40, 42 permit each of the shelves 20a, 20b, 20c, 20d and 20e to be individually adjusted so that water or other fluids can flow in a cascading manner from the reservoir 30 along the highest shelf 20a to the shelves 20b, 20c, 20d in turn, and finally to the lowest shelf 20e, after which the water flows into the funnel tank 34 for collection in a floor drain.

Figure 5:
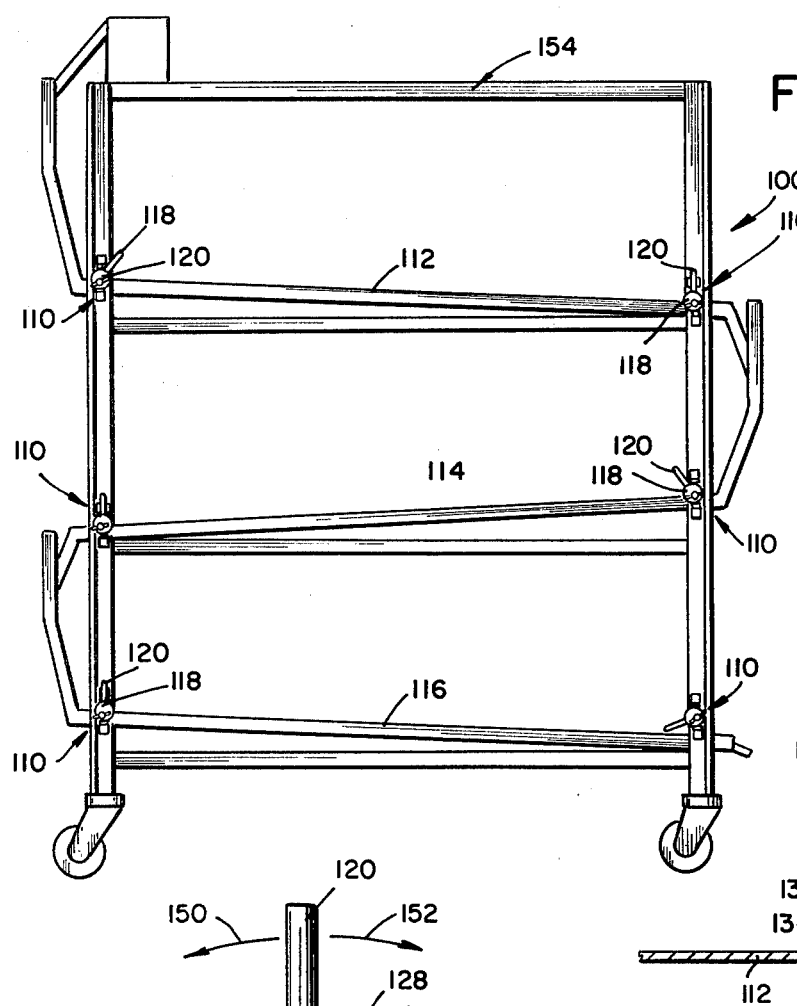
FIG. 5 is a front elevation view of an animal cage rack incorporating an alternative embodiment of shelf leveling devices.
Figure 6:
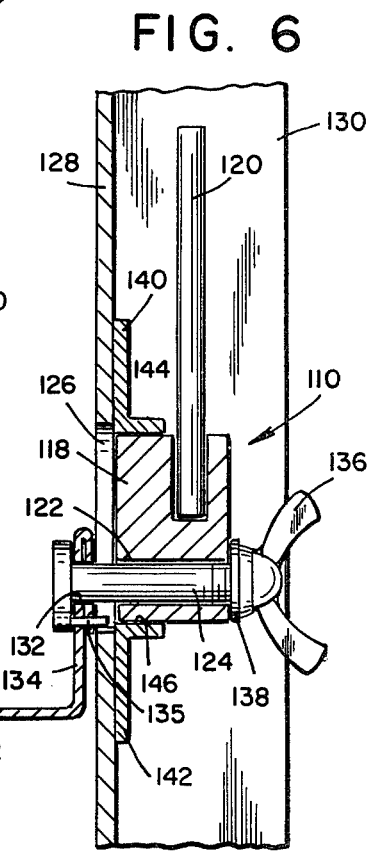
FIG. 6 is an enlarged fragmentary side view of a portion of the animal cage rack of FIG. 5 showing details of construction of the shelf leveling device, portions of which are shown in section.
Figure 7:
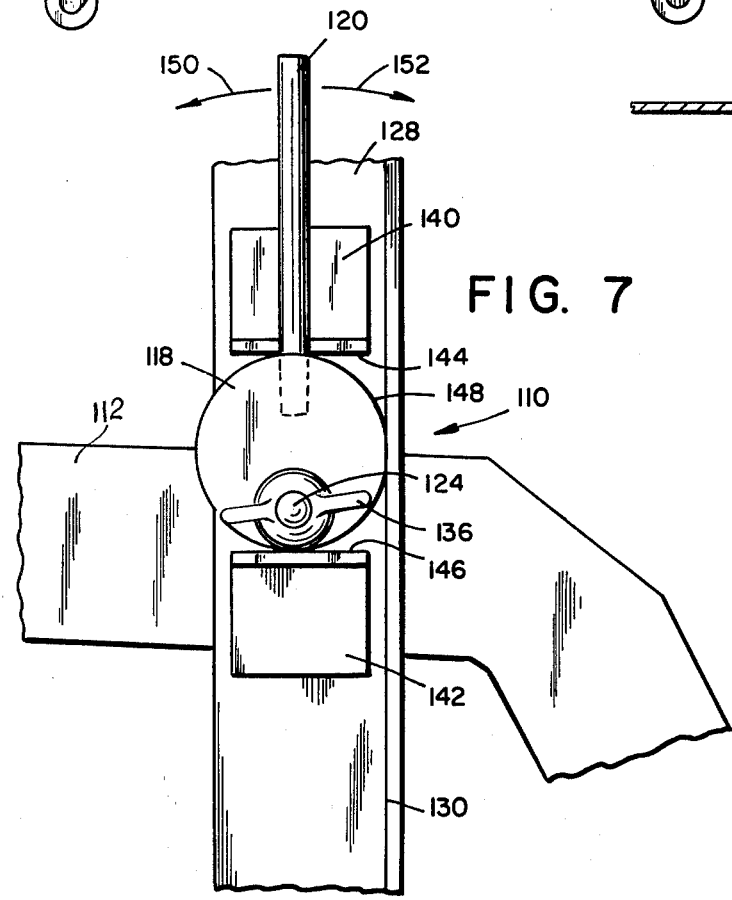
FIG. 7 is a fragmentary front view of the portion of the shelf leveling device shown in FIG. 6.
Figure 8:
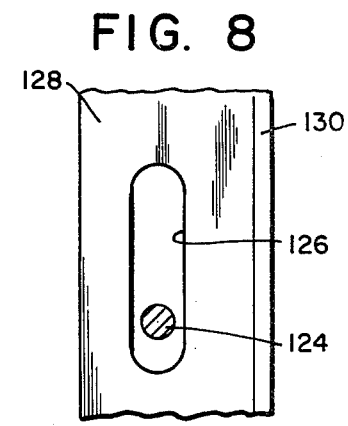
FIG. 8 is a fragmentary view of a portion of the upright member of the animal cage rack of FIG. 5.

In an alternative embodiment of animal cage rack 100 of the invention, which is best shown in FIG. 5, the shelf-leveling device is in the form of a cam assembly 110. The animal cage rack 100 is shown, by way of example, as having three adjustable shelves 112, 114 and 116, with a cam assembly 110 provided in each corner of each of the shelves 112, 114, 116. The cam assembly 110 is best shown in FIGS. 6 and 7 and comprises a circular cam 118 which includes a handle 120 and an eccentrically located hole 122. A pivot bolt 124 passes through the hole 122 in the circular cam 118, through an elongated hole 126 in the flange 128 of the upright rail member 130 and through a hole 132 in the flange 134 of the shelf 112. The pivot bolt 124 is prevented from turning by a roll pin 135 affixed to the head of said bolt, and is secured by means of a wing nut 136 and washers 138. A pair of L-shaped cam guides 140, 142 are fastened to the upright member 130. The horizontal surfaces 144, 146 of the cam guides 140, 142 are positioned in close proximity to the cylindrical surface 148 of the cam 118. When the handle 120 is turned in the direction of the arrow 150 or 152 in FIG. 7 the cam 118 rotates with respect to the upright rail 130. The position of the cam 118 is controlled by the cam guides 140, 142 and by the pivot bolt 124 which moves within the elongated hole 126. As the cam 118 rotates in the direction shown by the arrows 150 or 152, the pivot bolt 124 moves upward in the elongated hole 126, thereby raising the shelf 112. When the handle 120 is returned to the vertical position shown in FIG. 7, the pivot bolt 124 returns to the position shown in FIGS. 6 and 8, thereby lowering the shelf 112.

An identical cam assembly 110 is provided on each of the four corners of each of the shelves 112, 114, 116 thereby making each corner of each shelf 112, 114, 116 individually adjustable with respect to the support frame 154 of animal cage rack 100.

FIG. 9 illustrates a modified animal cage rack 200 which incorporates another embodiment of shelf-leveling device, shown in FIGS. 9, 10 and 11. In this embodiment, the leveling devices are of the same cam type as shown in the embodiment of FIGS. 5-8, but are provided with an arrangement which accomplishes the simultaneous leveling of a corresponding corner of each of three shelves 210, 212, 214 mounted on rack 200. FIG. 9 shows three cam assemblies mounted on the upright rail 218, the cam assemblies being interconnected to form a leveling device 216. Three cam assemblies are also shown mounted on the upright rail 220, and are interconnected to form a leveling device 216. Two additional leveling devices 216 are also mounted on the other two upright rails (not shown) of the rack 200. Thus, each corner of each of the shelves 210, 212 and 214 is supported by an individual cam assembly.

FIGS. 10 and 11 illustrate in detail the construction of the leveling device 216 which is mounted on the upright rail 220, it being understood that the leveling devices 216 mounted on the three other upright rails are of identical construction. In FIGS. 10 and 11, a pair of angular cam guides 222 and 224 are shown mounted on the upright rail 220 in alignment with the shelf 210, and a second pair of cam guides 226 and 288 are mounted on rail 220 in alignment with the shelf 212. A similar pair of cam guides and associated cam structure (not shown) are also mounted on the rail 220 in alignment with the lowermost shelf 214, as indicated in FIG. 9.

The cam guides 222 and 224 are mounted on the upright rail 220 by means of screws 238 and 240 which extend through elongated slots 230 and 232 in the respective cam guides 222 and 224, thereby providing a means for adjustment of each of the cam guides 222 and 224 in a vertical direction. Similarly, the cam guides 226 and 228 are adjustably mounted on the upright rail 220 by means of screws 242 and 244 extending through elongated slots 234 and 236 in the cam guides 226 and 228.

Between the pair of cam guides 222 and 224 and the pair of cam guides 226 and 228, there are disposed respective circular cams 246 and 248 in a manner similar to that previously described. A pivot bolt 250 passes through a hole in the flange 254 of the shelf 210, through an elongated slot 258 in the flange 260 of the upright rail 220, and is threaded into an eccentrically located hole 262 in the cam 246, for attaching the shelf 210 to said cam 246. Similarly, the shelf 212 is attached to the cam 248 by a pivot bolt 252 which passes through a hole in the flange 256 of shelf 212, through an elongated slot in the flange 260 of the upright rail 220, and is threaded into an eccentrically located hole in the cam 248.

A handle 264 projects from the circumferential surface of the circular cam 246, the upper end of said handle 264 being attached to a connecting bar 270 by means of a lock knob 272 having a shaft 273, which is threaded onto a nut 274 attached to the handle 264. The cam 248 also has a handle 276 which projects upward from its circumferential surface 278 and is generally in vertical alignment with the handle 264. The handle 276 has an end portion 280 which is bent forming an angle of approximately ninety degrees with the handle 276. The end 282 of the end portion 280 passes through a clearance hole in the connecting bar 270 and is secured thereto by means of a split ring fastener 284.

When the lock knob 272 is loosened, the handles 264 and 276 may be rotated simultaneously by moving the connecting bar 270 in the direction of the arrows 286, 288 shown in FIG. 11. The connecting bar 270 causes both handles 264, 276 to rotate simultaneously, rotating both cams 246 and 248, and thereby adjusting the positions of the adjacent corners of both shelves 210 and 212 simultaneously.

When the desired position of the shelves 210, 212 is reached, the lock knob 272 is tightened, thereby preventing rotation of the handle 264 with respect to the connecting bar 270 and thereby fixing the position of the shelves 210, 212.

The provision of adjustable cam guides 222, 224, 226, 228 makes it possible for the vertical position of said cam guides to be adjusted to ensure that all of the shelves are properly oriented despite imperfections which may be formed in the various components during manufacture.

It is understood that although FIGS. 10 and 11, for convenience of illustration, shows only two cams 246 and 248 for adjusting the positions of shelves 210 and 212, an additional cam assembly is also provided for adjusting the position of shelf 214. This additional cam has a handle similar to the handle 276 and similarly connected to the connecting bar 270, as indicated in FIG. 9, for the purpose of adjusting the shelf 214.

It will also be understood that additional components corresponding to the handle 276, and the cam 248 may be incorporated in each of the shelf leveling devices 216 in order to accommodate animal cage racks having more than three shelves.

FIGS. 12 through 15 illustrate still another alternative embodiment of animal cage rack 300 made in accordance with the present invention, in which a shelf leveling device 310 is provided for accomplishing the simultaneous leveling of a corresponding corner of each of the shelves 312, 314, 316 using a single cam assembly. The leveling device 310 is one of four similar leveling devices disposed on each of the four upright rails of the animal cage rack 300 shown in FIG. 12. FIG. 12 shows the upright rails 318 and 320, each being provided with a leveling device 310, it being understood that behind each of the upright members 183, 320 there is a similar upright rail, not shown, located at the far corners of the shelves 312, 314 and 316.

The details of construction of the leveling device 310 are shown in FIGS. 13 and 14. The leveling device 310 comprises a circular cam 322 which is connected to the uppermost shelf 312 by means of a pivot bolt 324 which passes through a hole 326 in the flange 328 of shelf 312, through an elongated slot 330 in the flange 332 of the upright 320, through a clearance hole 334 in an elongated connecting link 336, and finally through an eccentrically located clearance hole 338 in the cam 322. The pivot bolt 324 is secured by means of a flat washer 340, lock washer 342 and a wing nut 344, to the cam 322.

The cam 322 includes a handle 346 which projects upwardly from the surface 348. The surface 348 is guided by means of guide blocks 350, 352 which project from the upright rail 320, with the guide block 350 disposed above and guide block 352 disposed below the cam 322.

The connecting link 336 is shown removed from the shelf leveling device 310 in FIG. 15, for the purpose of clarity of illustration. The connecting link 336 includes the circular clearance hole 334 through which the pivot bolt 324 passes, and a pair of elongated slots 356, 358. The shelf 314 is connected to the connecting link 336 by means of a shoulder screw 360 which passes through a hole 362 in the flange 364 of the shelf 314, through an elongated slot 366 in the flange 332 of upright member 320 and through the elongated slot 356 in the connecting link 336. The shoulder screw 360 is secured by means of a lock nut 368.

Although not shown in FIGS. 13 and 14, it is understood that the shelf 316 is connected to the connecting link 336 by a shoulder screw passing through the hole 358 of connecting link 336 in a similar manner to the shoulder screw 360.

When the wing nut 344 is loosened, the handle 346 may be rotated in either of the directions shown by the arrows 370, 372 in FIG. 14. When the handle 346 is so rotated, the cam 322 rotates, guided by the guide blocks 350 and 352, so that the pivot bolt 324 moves upwardly within the elongated hole 330, thereby raising the shelf 312. Simultaneously, as the shelf 312 is raised, shelves 314 and 316, which are connected to shelf 312 by the connecting link 336, are also raised a corresponding distance. When the desired positions of the shelves 312, 314, 316 are reached, the wing nut 344 is tightened, thereby clamping the cam 322 and the upper end of the connecting link 336 against the flange 332 of the upright 320 and thus locking the shelves 312, 314 and 316 against further movement.

The position of the shelves 314 and 316 with respect to the connecting link 336 may be adjusted by means of lock nuts such as the lock nut 368, within the limits of the elongated holes 356, 358. This feature makes it possible to adjust for the accumulation of tolerances by the various components during manufacture.

It is understood that an animal cage rack having three shelves has been shown by way of example only and that additional shelves may be accommodated by the shelf leveling device 310 by providing additional elongated holes in the connecting link 336 similar to holes 356 and 358.

Each of the four upright rails of the animal cage rack 300 is provided with a shelf leveling device similar to the shelf leveling device 310 of FIGS. 13 and 14, thereby facilitating the leveling of each of the corners of the shelves 312, 314, 316, with the corners of the shelves 312, 314, 316 which are vertically in line being leveled simultaneously.

While preferred embodiments of the invention have been shown and described herein, it is obvious that numerous omissions, changes and additions may be made in such embodiments without departing from the spirit and scope of the invention.

What is claimed is:

1. An animal cage rack for mounting a plurality of animal cages in horizontal rows, comprising
   a support frame having a plurality of spaced, vertically-disposed support members,
   a plurality of vertically-spaced shelves adapted to be mounted on said support, frame with a corner of each shelf supported by one of said support members,
   and shelf adjusting means mounted on each of said support members and connecting, one corner of at least one of said shelves to the adjacent support, member on which it is mounted,
   each of said shelf adjusting means including a movable member engaging and supporting one corner of at least one of said shelves, said member being manually and selectively movable in a vertical direction relative to the adjacent support member, whereby to vary the height of said one corner relative to the other corners of said shelf, without removing said shelf from said support frame,
   said shelf adjusting means also including locking means for retaining each corner of said shelves immovably on said support members after said shelves have been adjusted.

2. An animal cage rack according to claim 1 which further includes a fluid reservoir mounted at the top of said support frame and a fluid receiving tank mounted at the bottom of said support frame, and in which each of said shelves has an upper surface located below a row of said animal cages and constituting ramp means for directing a flow of fluid from said reservoir, along the upper surfaces of said shelves, to said fluid receiving tank, said shelves being inclined alternately in opposite directions, said shelf adjusting means being adjustable to vary the inclination of said shelves relative to said support members so that fluid flows from said fluid reservoir in a cascading manner from shelf to shelf until it is collected in said fluid receiving tank.

3. An animal cage rack according to claim 1 in which said shelf adjustment means comprises a plurality of support blocks mounted on each of said support members with each of said support blocks having a vertically-disposed threaded bore and a height adjustment screw threadedly mounted in said bore and having an end portion upstanding therefrom, the corner portions of said shelves resting upon the end portions of said height adjustment screws.

4. An animal cage rack according to claim 3 in which said locking means comprises a pair of side flanges disposed on each of said shelves and having portions located adjacent to each of said support members, with an aperture in each of said portions, a plurality of vertically-elongated slots in said support members in registry with each of said apertures, a bolt extending through each of said elongated slots and registering aperture, and a nut threaded upon each of said bolts, which, when tightened on said bolt clamps the adjacent shelf flange portion against said support member.

5. An animal cage rack according to claim 1 in which said shelf adjusting means comprises a cam member rotatably mounted on each corner of each of said shelves, a pair of vertically spaced cam guides for each of said cam members for rotating said cam members between said cam guides, an elongated slot in each of said support members adjacent each of said cam members, and a pivot bolt extending through each of said elongated slots and secured eccentrically to the adjacent cam member, each pivot bolt being connected to a corner of one of said shelves for adjusting said shelf corner vertically when the corresponding cam member is rotated.

6. An animal cage rack according to claim 5 in which said cam member comprises a cylindrical cam and in which said pivot bolt extends eccentrically through said cylindrical cam, said locking means including a threaded fastener mounted on said pivot bolt for releasably clamping said bolt against said vertically-disposed support member.

7. An animal cage rack according to claim 1, in which said shelf adjusting means comprises a plurality of cam members mounted on each of said vertically-disposed support members, means connecting each cam member to a corner of a respective shelf, a cam guide associated with each of said cam members, said cam guides being mounted on said support members and each being positioned to guide the turning movement of the associated cam member, a handle projecting from each of cam members and operable to turn said cam member to adjust the height of the connected shelf corner, and a vertically-disposed elongated connecting bar extending along each of said support members and interconnecting the handles of each of the cam members on said support member, whereby movement of said connecting bar turns all of the connected handles to adjust the corresponding corners of said shelves simultaneously.

8. An animal cage rack according to claim 7 in which said locking means comprises a lock knob mounted on back of said connecting bars and connected to one of said handles, said lock knob being operable to lock said handle against said connecting bar, thereby preventing rotation of said cam means relative to the corresponding support member.

9. An animal cage rack according to claim 7 in which said cam guides are adjustably mounted on said support members.

10. An animal cage rack according to claim 1, in which said shelf adjusting means comprises a pair of vertically-spaced cam guides mounted on each of said vertically-disposed support members, a circular cam member disposed between each pair of cam guides for rotation therebetween, a handle projecting from each of said cam members, a vertically-disposed elongated link connected to each cam member, and means connecting a corner of each of said shelves to said link, whereby rotation of a cam member by means of its projecting handle moves said link vertically to adjust simultaneously the vertical positions of all of the shelf corners connected to said link.

11. An animal cage rack according to claim 10 in which a pivot bolt connects each of said cam members to an adjacent corner of one of said shelves, said pivot bolt extending through an elongated vertical slot in the corresponding support member, through an aperture in the adjacent elongated link, and through an eccentric bore in said cam member, said locking means comprising a threaded fastener mounted on said pivot bolt and adapted to releasably clamp said cam member and said link against said support member, thereby locking said link against motion relative to said support member.

12. An animal cage rack according to claim 10 which also includes means for adjustably connecting the corners of said shelves to said elongated links.

* * * * *